US008529338B2

(12) United States Patent
Allen et al.

(10) Patent No.: US 8,529,338 B2
(45) Date of Patent: Sep. 10, 2013

(54) IN-CASINO TO ONLINE CASINO INTERACTIVITY

(75) Inventors: Jeffrey L. Allen, Naperville, IL (US); Larry J. Pacey, Northbrook, IL (US); Matthew J. Ward, Northbrook, IL (US)

(73) Assignee: WMS Gaming, Inc., Waukegan, IL (US)

( * ) Notice: Subject to any disclaimer, the term of this patent is extended or adjusted under 35 U.S.C. 154(b) by 102 days.

(21) Appl. No.: 13/122,652

(22) PCT Filed: Sep. 30, 2009

(86) PCT No.: PCT/US2009/059144
§ 371 (c)(1),
(2), (4) Date: Apr. 5, 2011

(87) PCT Pub. No.: WO2010/042375
PCT Pub. Date: Apr. 15, 2010

(65) Prior Publication Data
US 2011/0183749 A1 Jul. 28, 2011

Related U.S. Application Data

(60) Provisional application No. 61/103,624, filed on Oct. 8, 2008.

(51) Int. Cl.
*A63F 9/24* (2006.01)
(52) U.S. Cl.
USPC .......................................................... 463/25
(58) Field of Classification Search
USPC .......................................................... 463/25
See application file for complete search history.

(56) References Cited

U.S. PATENT DOCUMENTS

| 5,283,734 | A | 2/1994 | Von Kohorn |
| 6,168,521 | B1 | 1/2001 | Luciano et al. |
| 6,302,793 | B1 | 10/2001 | Fertitta et al. |
| 6,837,788 | B2 | 1/2005 | Cannon |
| 7,364,508 | B2 | 4/2008 | Loose et al. |
| 7,931,531 | B2 | 4/2011 | Oberberger |
| 2003/0032474 | A1 | 2/2003 | Kaminkow |
| 2003/0171149 | A1 | 9/2003 | Rothschild |
| 2004/0142750 | A1 | 7/2004 | Glisson et al. |
| 2005/0170883 | A1 | 8/2005 | Muskin |

(Continued)

FOREIGN PATENT DOCUMENTS

| JP | 1998(H10)57578 | 3/1998 |
| WO | WO2010042375 | 4/2010 |

OTHER PUBLICATIONS

PCT Application No. PCT/US09/59144 International Preliminary Report on Patentability, Mar. 28, 2011, 17 pages.
PCT Application No. PCT/US09/59144 International Search Report, Dec. 15, 2009, 9 pages.

*Primary Examiner* — Corbett B Coburn
(74) *Attorney, Agent, or Firm* — F;DeLizio, Gilliam, PLLC

(57) ABSTRACT

A wagering game system and its operations are described herein. In embodiments, the operations can include determining an achievement by a player account that occurs during a wagering game session and rewarding the player accounts achievement according to achievement settings or business rules. The operations can also include generating achievement data with marketing metadata and providing the achievement data to a marketing provider to market to the player account based on the achievement data. In some embodiments, the operations can also include presenting the achievement data on a website, such as a personal wagering game web log "gaming blog".

20 Claims, 10 Drawing Sheets

(56) References Cited

U.S. PATENT DOCUMENTS

| | | | |
|---|---|---|---|
| 2006/0211486 A1* | 9/2006 | Walker et al. | 463/25 |
| 2007/0155491 A1 | 7/2007 | Okada | |
| 2008/0009344 A1 | 1/2008 | Graham et al. | |
| 2008/0066111 A1 | 3/2008 | Ellis et al. | |

* cited by examiner

IN-CASINO TO ONLINE CASINO INTERACTIVITY

RELATED APPLICATIONS

This application claims the priority benefit of U.S. Provisional Application Ser. No. 61/103,624 filed Oct. 8, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems and networks that, more particularly, control and present in-casino and online casino interactivity.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises determining an achievement by a wagering game player account that occurs during a wagering game session, wherein the wagering game session includes achievement data that describes information related to the achievement; awarding the achievement according to achievement settings that indicate awards for accomplishing preset wagering game activities; associating marketing metadata with the achievement data; and providing the achievement data and the marketing metadata to a marketing provider to market to the wagering game player account based on one or more of the achievement data and the marketing metadata.

In some embodiments, awarding the achievement comprises determining an award setting that correlates to one of the achievement settings associated with the achievement; providing an award indicated by the award setting to the wagering game player account.

In some embodiments, associating the marketing metadata with the achievement data comprises: generating marketing tags with descriptions of one or more of the achievement, the wagering game session, demographics about the wagering game player account, a playing history, game classifications, and the location of the wagering game player account; and assigning the marketing tags to portions of the achievement data that correlate to the descriptions.

In some embodiments, the method further comprises using the marketing data to drive traffic to one or more of a casino website, a third party website, and a physical casino location.

In some embodiments, the method further comprises using the marketing data to provide one or more of promotions, coupons, and marketing material to the wagering game player account.

In some embodiments, an apparatus, comprises means for receiving achievement data for a wagering game player account, where the achievement data contains one or more marketing tags pertaining to information about an achievement obtained by the wagering game player account; means for determining personal information related to the wagering game player account; means for accessing marketer information that correlates to the one or more marketing tags, wherein the marketer information includes data for one or more incentive providers and one or more incentives offered by the one or more incentive providers; means for determining at least one of the one or more marketing incentives offered by one or more incentive providers indicated in the marketer information; and means for providing the one or more marketing incentives to the wagering game player account.

In some embodiments, the means for determining personal information related to the wagering game player account comprises: means for determining one or more of demographic information, game play history, player profile data, preference settings, and contact information for the wagering game player account; and means for determining one or more of game theme data, game type data, and game origin data for a wagering game session in which the achievement was obtained.

In some embodiments, the means for determining at least one of the one or more marketing incentives comprises: means for generating analysis data of one or more of the personal information, descriptions in the marketing tags, and wagering game session information; means for determining, using the analysis data, at least one marketing incentive that the wagering game player account prefers; means for determining at least one incentive provider that provides the marketing incentive; and means for generating a redemption certificate for the marketing incentive redeemable by the incentive provider.

In some embodiments, the means for determining at least one of the one or more marketing incentives comprises: means for presenting a proposed marketing incentive to an incentive provider; means for receiving modifications to the proposed marketing incentive by the incentive provider; means for generating a modified proposed marketing incentive using the modifications; and means for including the modified proposed marketing incentive in the one or more marketing incentives.

In some embodiments, an apparatus comprises a wagering game module configured to determine a selection of a replay control, wherein the replay control is configured to present a replay of a wagering game, present a game replay of the wagering game, determine a selection, by a player account, of a point in the game replay to play out a portion of wagering game activity in the wagering game, determine that a wagering game result has not been completely presented yet in the game replay for the portion of the wagering game activity, determine a wager amount from the player account, generate a new wagering game result, and present the new wagering game result for the portion of the wagering game activity.

In some embodiments, the wagering game module is further configured to present an automated commentator that automatically comments on the wagering game replay.

In some embodiments, the wagering game module is further configured to stream metadata for the game replay, wherein the metadata includes instructions about events that occurred within the wagering game, and reconstruct the wagering game using the metadata and wagering game assets.

In some embodiments, the wagering game module is further configured to modify the wager amount based on a degree of the wagering game result that is presented from the game replay.

In some embodiments, the wagering game module is further configured to determine that the new wagering game result is a win, and transact a winning value to the player account.

In some embodiments, the wagering game module is further configured to present the game replay on a wagering game web log, and present comments from web log patrons about the game replay.

In some embodiments, the wagering game module is further configured to present wagering controls for the web log patrons to wager on the portion of the wagering game activity.

In some embodiments, one or more machine-readable media having instructions stored thereon, which when executed by a set of one or more processors causes the set of one or more processors to perform operations comprising: determining player preference information in a player profile for a wagering game player account; comparing the player preference information to user account preference information for one or more other accounts; determining similarities in the player preferences for the wagering game player account and the user account preferences for the one or more other accounts; determining a group of the one or more other accounts that have similarities; and presenting an interface that displays the group of the one or more other accounts that have the similarities.

In some embodiments, the operations further comprise presenting one or more controls to filter the group based on categories of similarities.

In some embodiments, the operations further comprise introducing the wagering game player account to one or more of the group.

In some embodiments, the operations further comprise scheduling an event for the wagering game player account and one or more of the group to socially interact.

In some embodiments, the operations further comprise suggesting wagering game preferences to the wagering game player account, wherein the wagering game preferences are possessed by one or more of the group.

In some embodiments, a system comprises a wagering game server comprises; an achievement award module configured to determine one or more achievements of one or more wagering game player accounts during wagering game activity, and provide one or more recognitions to the one or more wagering game player accounts for the one or more achievements; and a wagering game machine comprising a gaming web log object controller configured to automatically generate one or more web log entries related to the one or more achievements, and present the one or more web log entries on a wagering game web log for the one or more wagering game player accounts.

In some embodiments, the wagering game server further comprises a marketing module configured to receive marketing data regarding the one or more achievements, and use the marketing data to market to the one or more wagering game player accounts.

In some embodiments, the wagering game machine further comprises a game replay module configured to present a replay of the wagering game activity, and provide a break-out gaming session for a selected portion of the wagering game activity.

In some embodiments, the system further comprises an account server including a player preferences settings configured to store player preferences for the one or more wagering game player accounts, and wherein the wagering game server further comprises an account comparison module configured to compare similarities between the one or more wagering game player accounts and other social contact accounts, and provide a social introduction between the one or more wagering game player accounts and one or more of the other social contact accounts.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Wagering games are expanding in popularity. Many gamers are demanding greater access to wagering games and content related to wagering games. As a result, some wagering game companies have created social network sites and online casinos that provide a way for wagering game player ("players") to congregate and share their passion for wagering games online. A social network site allows social network users to create user accounts with one or more unique identifiers that represent an online persona. However, social networks and online casino face challenges appealing to some wagering game enthusiasts. Hence, some embodiments of the inventive subject matter enable wagering game companies to combine the fun of social networks with the enjoyment and excitement derived from playing wagering games. Some embodiments (e.g., see FIGS. 1, 3 and 4) can detect player account achievements, reward the player account for the achievements, share marketing data regarding the achievement and the player account, and provide marketing incentives to the player account. Some embodiments, (e.g., see FIGS. 5 and 6) can present a gaming web log ("blog") that can replay wagering games, automatically comment on wagering game play, and enable a new or "break-out" gaming session based on the wagering game replay (i.e., a "break-out" gaming session, referred to herein, is a gaming session where an observer of a wagering game replay can select a point in a wagering game replay and begin playing a new wagering game, with different wagering game results, but with elements of the wagering game replay presented in the new wagering game—in other words, the observer "breaks out" or "breaks-away" from the wagering game replay to play the new game). Some embodiments, (e.g., see FIGS. 5 and 6) can compare similarities between wagering game player accounts, match player accounts for social interaction, introduce player accounts, and suggest preferences (e.g., preferred wagering games by other player accounts).

Figure 1:
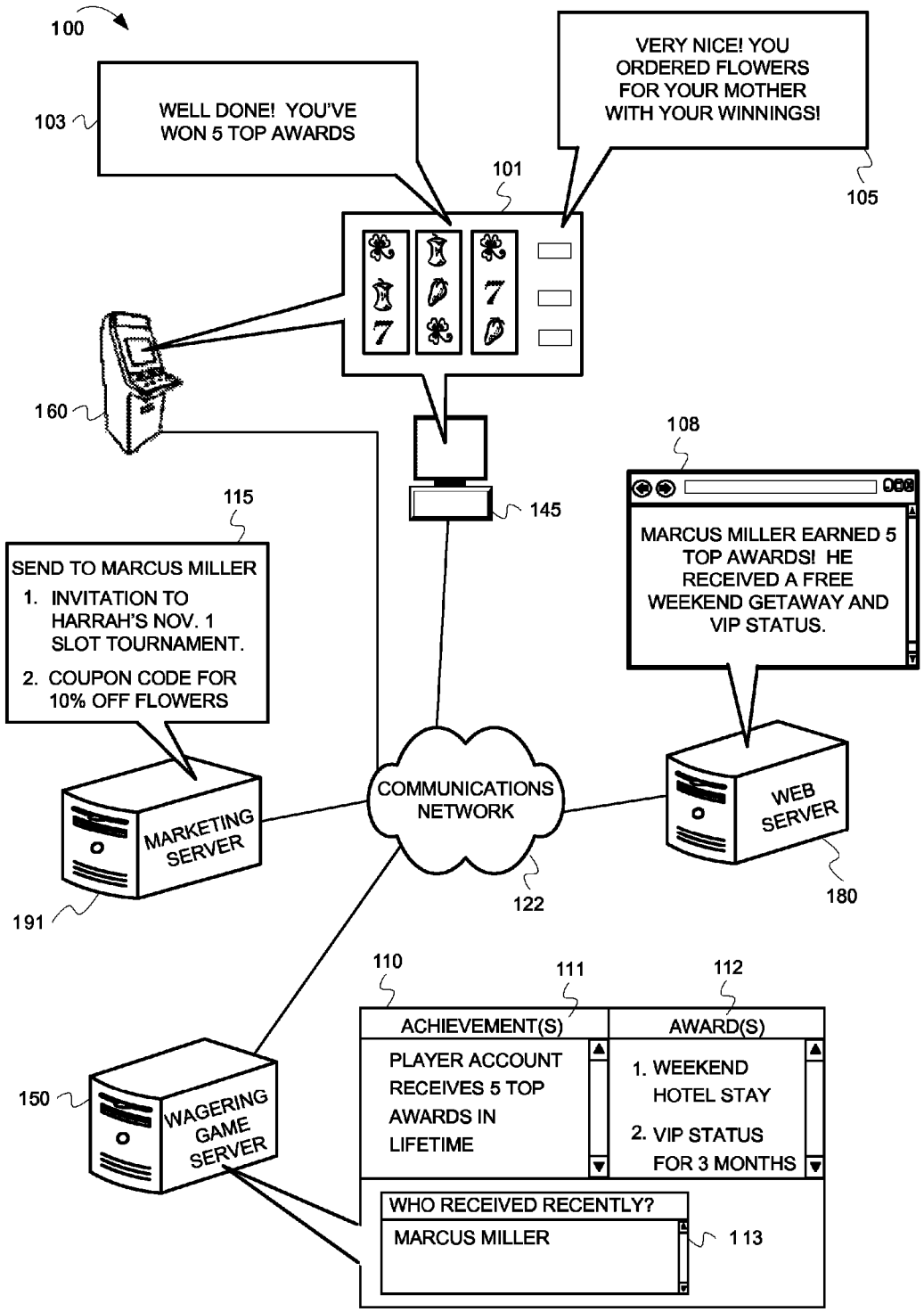
FIG. 1 is an illustration of awarding online gaming achievements and sharing achievement data with marketers, according to some embodiments.

FIG. 1 is a conceptual diagram that illustrates an example of awarding online or in-casino gaming achievements and sharing achievement data with marketers, according to some embodiments. In FIG. 1, the wagering game system ("system") 100 includes a wagering game server ("gaming server") 150 connected to a client computer system ("computer") 145 and a wagering game machine 160 via a communications network 122. The gaming server 150 can provide wagering game content, wagering game account services, or other services and data associated with wagering games, player accounts, etc. The gaming server 150 can interact with a web server 180, via the communications network 122. The web server 180 can host an online casino or other wagering game related website, which the computer 145 accesses and presents in a display 101. Similarly, the wagering game machine 160 can access the same, or similar information, including wagering game content hosted by the gaming server 150. The wagering game machine 160 can also present the wagering game content on the display 101. Although the wagering game machine 160 and the computer 145 both appear to present the same display 101 simultaneously, the display 101 is a representation of what either the wagering game machine 160 or the computer 145 can display independently, and not necessarily simultaneously. The gaming server 150 can be part of a casino network but can also serve games outside of the casino. The casino network can include one or more casino network devices associated with a casino network such as additional wagering game servers, account servers, awards servers, advertising servers, monitoring equipment, or other devices (not shown). The gaming server 150 can also be connected to a marketing server 191 via the communications network 122.

In some embodiments, the system 100 can present a wagering game session (e.g., an in-casino wagering game session on the wagering game machine 160) within the display 101 and monitor a player accounts activities. The player account may accomplish a noteworthy gaming objective (e.g., reach a top score, receive a special award, play a round of new wagering games in a certain time period, hit a jackpot, get a royal flush, etc.), or perform some other notable activity that isn't a gaming objective (e.g., buy a round of drinks for friends, donate winnings to charity, stay within a pre-set gambling limit, buy a gift for a relative, help someone in a casino, etc.). The system 100 can detect the player's accomplishment, whether achieved while the player is logged on to an online casino or while the player account was within a casino, and present a recognition and/or award for the achievement. The web server 180 can present achievement recognizers 103 and 105 that congratulate the player account on their achievement (e.g., on the display 101, via sound messages, via email, etc.). The gaming server 150 can have settings 110 that correlate one or more award values stored in an awards setting 112 that correlate to an achievement value indicated in an achievement setting 111. The gaming server 150 can also store player information 113 on the player account that obtained the achievement and/or award. The system 100 can present the award to the player account and present recognitions of the achievement and award on a website 108. The system 100 can also provide marketing data regarding the achievement and the player account to the marketing server 191. The marketing server 191 can provide marketing incentives 115 to the player account based on the marketing data.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
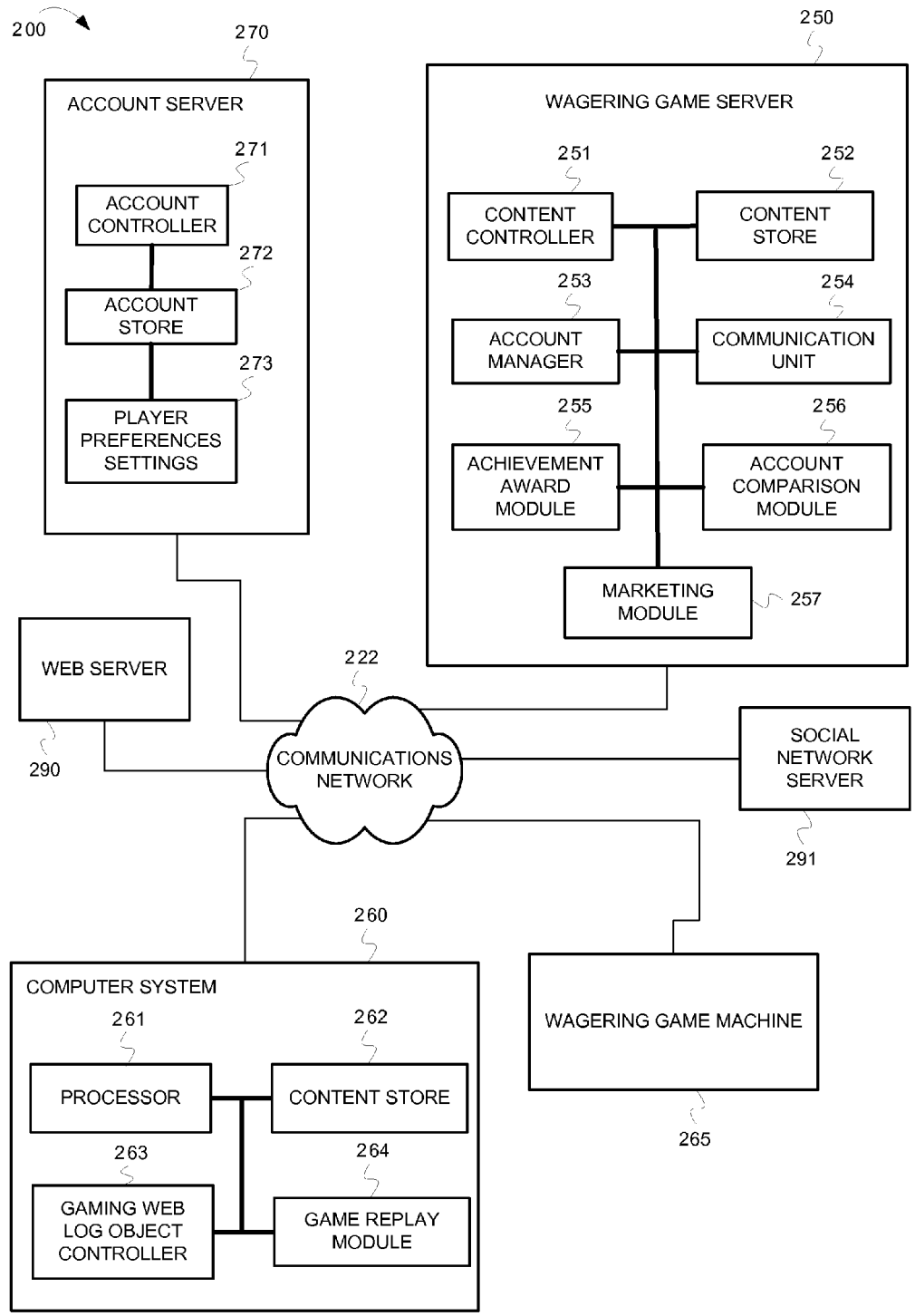
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers. The account server 270 can include an account controller 271 configured to control information for a player's account. The account server 270 can also include an account store 272 configured to store information for a player's account. The account server 270 can also include a player preferences settings 273 configured to store settings associated with player preferences, profiles, demographics, contact information, and other personal information.

The wagering game system architecture 200 can also include a wagering game server 250 configured to control wagering game content, provide random numbers, and communicate wagering game information, account information, and other information to and from one or more client machines, such as a computer system ("computer") 260 and/ or a wagering game machine 265. The computer 260 and the wagering game machine 265 may be referred to collectively as wagering game clients 260, 265. The wagering game server 250 can include a content controller 251 configured to manage and control content for the presentation of content on the wagering game clients 260, 265. For example, the content controller 251 can generate game results (e.g., win/loss values), including win amounts, for games played on the wagering game clients 260, 265. The content controller 251 can communicate the game results to the wagering game clients 260, 265. The content controller 251 can also generate random numbers and provide them to the wagering game clients 260, 265 so that the wagering game clients 260, 265 can generate game results. The wagering game server 250 can also include a content store 252 configured to contain content to present on the wagering game clients 260, 265. The wagering game server 250 can also include an account manager 253 configured to control information related to player accounts. For example, the content controller 251 can communicate wager amounts, game results amounts (e.g., win amounts), bonus game amounts, etc., to the account server 270. The wagering game server 250 can also include a communication unit 254 configured to communicate information to the wagering game clients 260, 265 and to communicate with other systems, devices and networks. For example, the communication unit 254 can track and communicate with community wagering game servers, account servers, community servers, social networking servers, file sharing servers, etc. The wagering game server 250 can also include an achievement award module 255 configured to determine achievements obtained by player accounts and provide awards, recognitions, etc. The wagering game server 250 can also include an account comparison module 256 configured to compare similarities between user accounts, group the similar user accounts, present the similar user accounts, introduce similar user accounts, etc. The wagering game server 250 can also include a marketing module 257 configured to receive marketing data regarding a player accounts achievements, history, demographics, etc. and use the marketing data to market to the player account.

The wagering game system architecture 200 can also include the computer 260 configured to present and control wagering game content. The computer 260 can include a processor 261 configured to process wagering game content and online wagering game objects, and present online casino content on the computer 260. The computer 260 can also include a content store 262 configured to contain content to present on the computer 260. The computer 260 can also include a gaming web log object controller 263 configured to share recordings of casino activity in a personal gaming blog. The gaming web log object controller 263 is further configured to add comments, text, pictures and other multi-media modifications to the blog website. The computer 260 can also include a game replay module 264 configured to control replays of wagering games, including providing break-out gaming sessions to player accounts that view the replays of wagering games.

Figure 9:
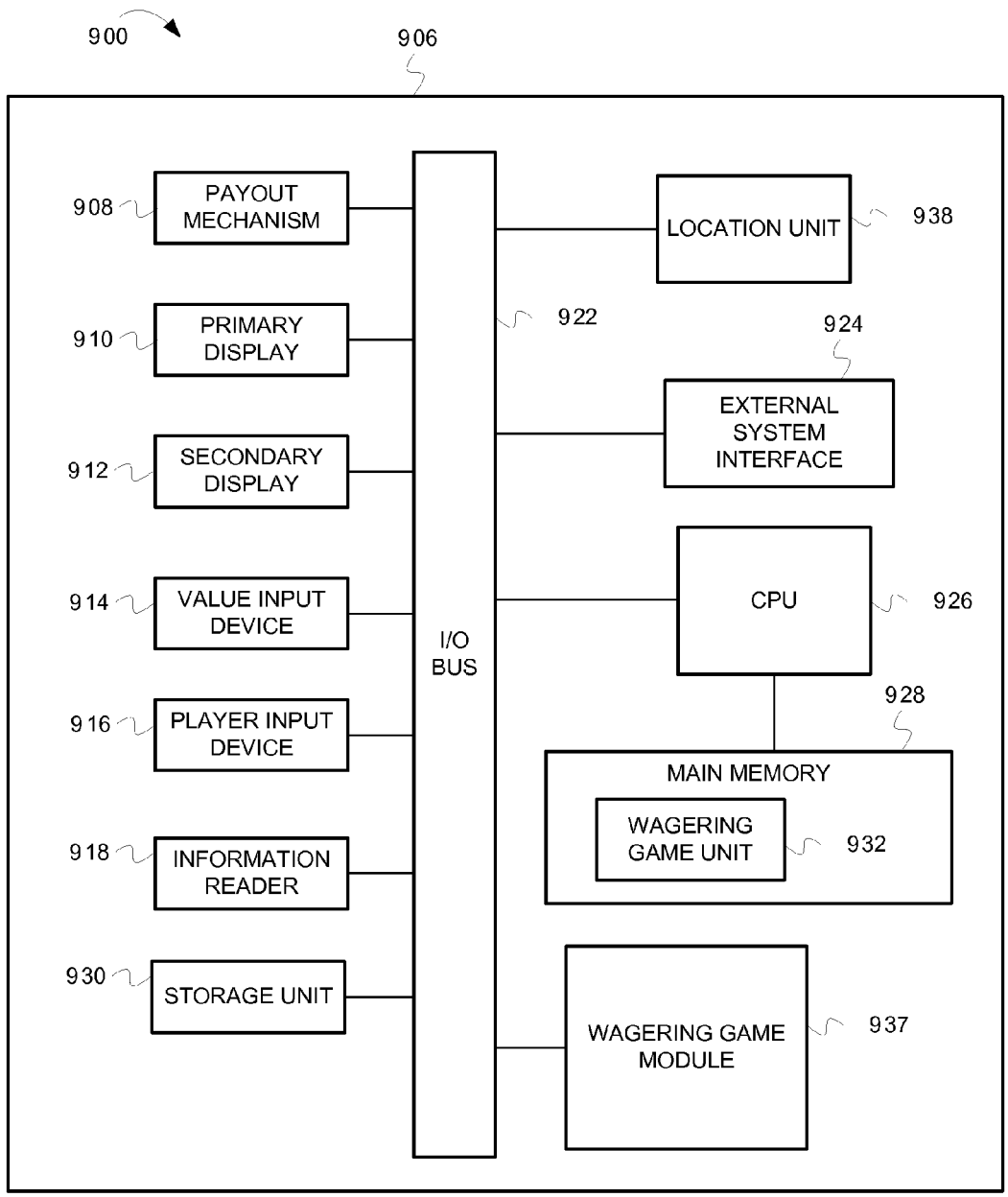
FIG. 9 is an illustration of a wagering game machine architecture 900, according to some embodiments.

The wagering game system architecture 200 can also include the wagering game machine 265. The wagering game machine 265 can include the same components as the computer 260 (e.g., the processor 261, the content store 262, the game web log object controller 263, and the game replay module 264). The wagering game machine 265 can also include architecture components configured specifically for use in a casino. FIG. 9 illustrates an exemplary wagering game machine architecture 900.

The wagering game system architecture 200 can also include a web server 290 configured to host online wagering game content and control information for online wagering games, to provide monitored data of achievements and accomplishments, to track locations and movements of player accounts, to present marketing incentives, etc. The web server 290 can be connected to the wagering game server 250 and receive wagering game content, game results, account information, award achievement information, marketing information, etc. from the wagering game server 250.

The wagering game system architecture 200 can also include a social network server 291 configured to provide social network content and social network account information.

Each component shown in the wagering game system architecture 200 is shown as a separate and distinct element connected via a communications network 222. However, some functions performed by one component could be performed by other components. For example, the wagering game server 250 can also be configured to perform functions of the gaming web log object controller 263, the game replay module 264, and other network elements and/or system devices. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
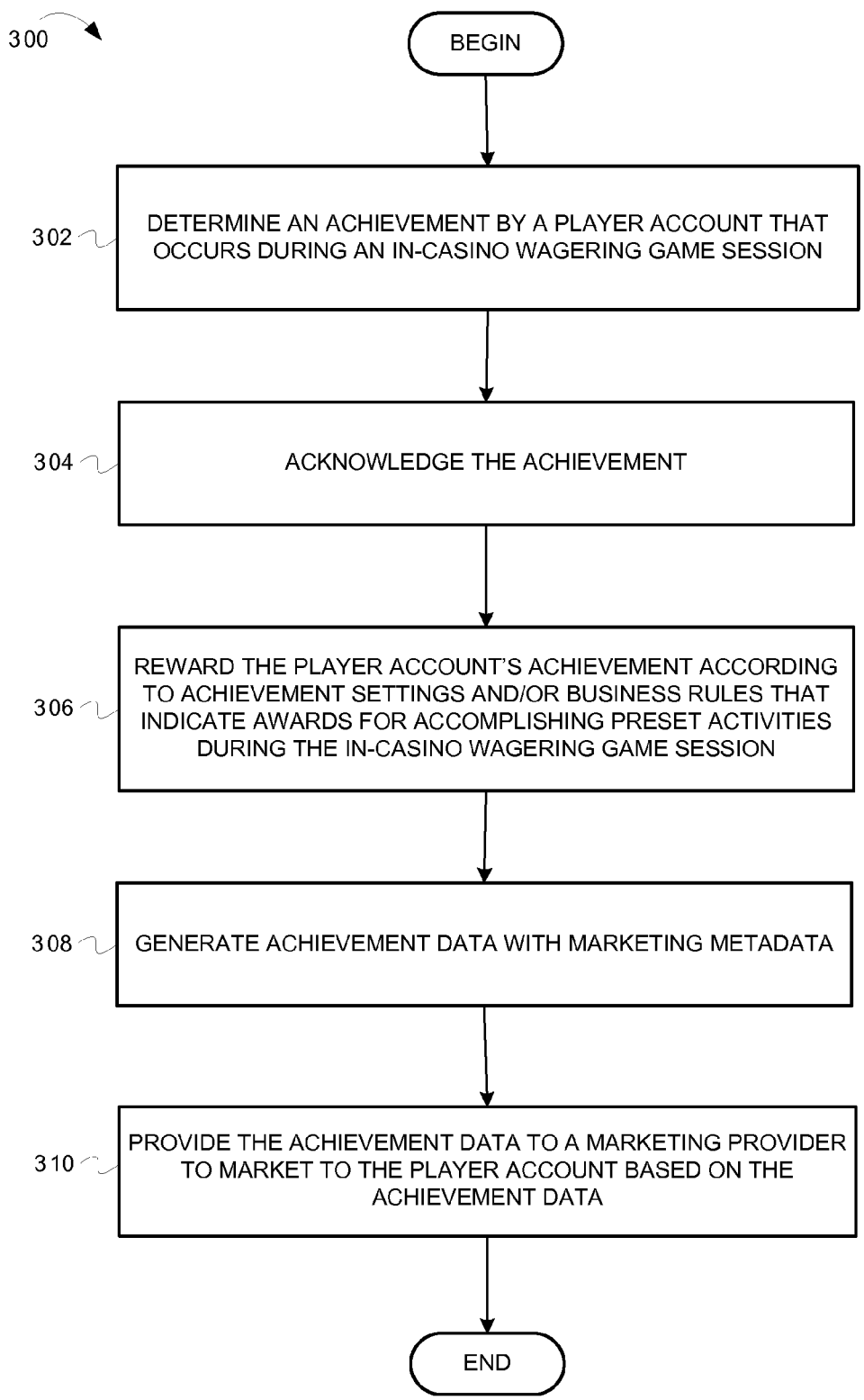
FIG. 3 is a flow diagram 300 illustrating awarding online gaming achievements and sharing achievement data with marketers, according to some embodiments.

FIG. 3 is a flow diagram ("flow") 300 illustrating awarding gaming achievements and sharing achievement data with marketers, according to some embodiments. FIG. 1 is a conceptual diagram that helps illustrate the flow of FIG. 3, according to some embodiments. This description will present FIG. 3 in concert with FIG. 1. In FIG. 3, the flow 300 begins at processing block 302, where a wagering game system ("system") determines an achievement by a player account that occurs during an in-casino wagering game session. In some embodiments, the system can determine achievements for wagering game activity (e.g., won top score or award, accomplished a game goal, spent a specific amount of money on wagering games, played a group of new games, completed a group wagering game or activity, etc.). In some embodiments, the system can determine achievements for non-wagering game activity (e.g., helped a person on a casino floor, donated winnings to charity, purchased a gift for another person using winnings, accessed a number of links or advertisements, etc.).

The flow 300 continues at processing block 304, where the system acknowledges the achievement. In some embodiments, the system can acknowledge the achievement via a recognition display, a certificate, an email, etc. For instance, in FIG. 1, the system 100 presented the achievement recognizers 103 and 105 on the wagering game machine 160 and/or the computer 145. In other embodiments, the system 100 can send the achievement recognizers 103 and 105 via email, by cell phone, etc. In some embodiments, the system can post the achievements on a website (e.g., website 108 in FIG. 1). In some embodiments, the system can send notifications to friends via cell phone, via social network accounts, via wagering game machines, etc.

The flow 300 continues at processing block 306, where the system rewards the player account's achievement according to achievement settings and/or business rules that indicate awards for accomplishing preset activities during in-casino wagering game sessions. In some embodiments, the system can reward the player account with medals, status points, experience points, comps, perks, amenities, invitations, access to rooms, etc. In some embodiments, the system can utilize settings or rules that consider (1) accomplishments that are rare or difficult to accomplish, whether based on skill or chance (e.g., four wins in a row, a royal flush, received a top award a certain number of times), (2) the time period or duration in which the accomplishment was completed (e.g., completed the accomplishment within an hour, a week, a lifetime), and/or (3) the type of the accomplishment (e.g., wagering game accomplishment versus non-wagering game accomplishment). The system can award the accomplishment accordingly (e.g., wagering game accomplishment may receive monetary awards, while non-wagering game activity may receive non-monetary awards).

The flow 300 continues at processing block 308, where the system generates achievement data with marketing metadata. In some embodiments, the system can generate marketing metadata that include identifiers, or tags, that pertain to one or more of the achievement (e.g., what the achievement was, when the achievement was accomplished, what game the achievement was accomplished on, etc.), a wagering game (e.g., a game theme, a game type, a game origin), the player account (e.g., status, levels, demographic information, friends, preferences, etc.), the player account's playing history, game classifications, the origin of the data, configurations or settings, online voting history, online rating history, etc. The system can analyze descriptions of information into the metadata tags and assign the metadata tags to marketing categories. A marketing server can use the metadata tags and marketing categories to determine marketing incentives to provide to the player account (as described in further detail in FIG. 4).

The flow 300 continues at processing block 310, where the system provides the achievement data to a marketing provider to market to the player account based on the achievement data. In some embodiments, the system can use the data to drive traffic to a casino website, to a partner's website, to a physical casino, or other physical location. In some embodiments, the system can use the data to provide promotions, coupons, coupon codes, gift certificates, and other marketing incentives and/or marketing material (e.g., advertisements, brochures, etc.).

Figure 4:
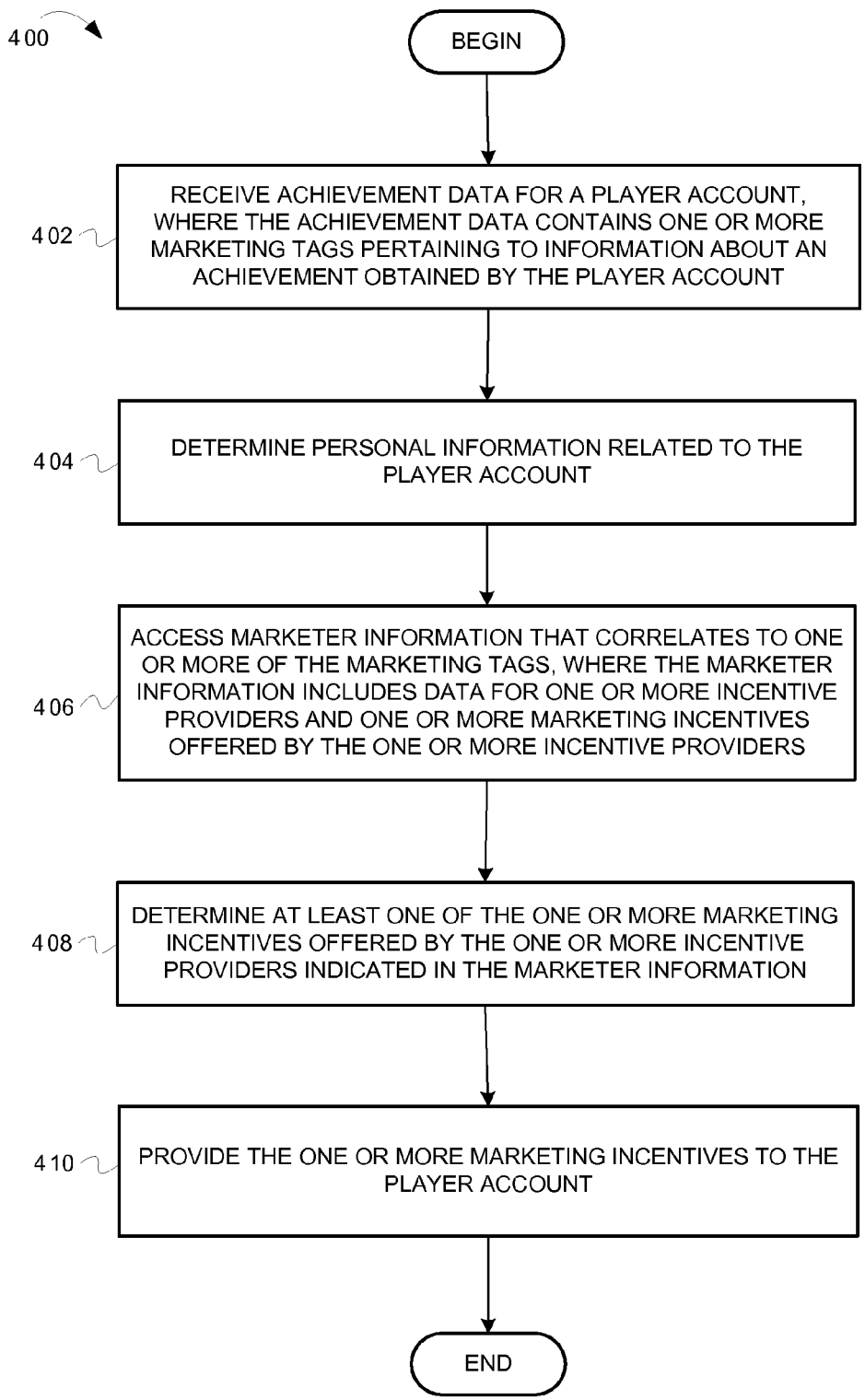
FIG. 4 is a flow diagram 400 illustrating using online gaming achievement data to market to wagering game player accounts, according to some embodiments.

FIG. 4 is a flow diagram ("flow") 400 illustrating using gaming achievement data to market to wagering game player accounts, according to some embodiments. FIG. 1 is a conceptual diagram that helps illustrate the flow of FIG. 4, according to some embodiments. This description will present FIG. 4 in concert with FIG. 1. In FIG. 4, the flow 400 begins at processing block 402, where a wagering game system ("system") receives achievement data for a player account. The achievement data contains one or more marketing tags pertaining to information about an achievement obtained by the player account. In some embodiments, the system can generate and assign marketing tags to the achievement data as described at the processing block 306.

The flow 400 continues at processing block 404, where the system determines personal information related to the player account. In some embodiments, the system can determine personal information that is stored in player settings, account settings, profiles, financial accounts, player history stores, critical game data, personal devices (e.g., attached hard drives, accounting software, etc.), or other locations. The personal information can include demographic information, contact information, and other information which the system can later use to focus, or target, marketing for the player account.

The flow 400 continues at processing block 406, where the system accesses marketer information that correlates to one or more of the marketing tags. The marketer information includes data for one or more incentive providers and one or more marketing incentives offered by the one or more incentive providers. For example, in FIG. 1, the marketing server 191 can include lists of marketing partners of an online casino website or a physical, "brick-and-mortar" casino. The marketing server 191 can list potential marketing incentives that each of the marketing partners, the online casino website, and/or the casino, are willing to provide to a player account based on the player account's demographics, marketing categories, sales goals, etc.

The flow 400 continues at processing block 408, where the system determines at least one of the one or more marketing incentives offered by the one or more incentive providers indicated in the marketer information. In some embodiments, the system can analyze one or more of the personal information (e.g., the demographic data, game play history, profile data, preference settings, etc.) and the descriptions in the marketing metadata (e.g., marketing tags, marketing categories, etc.) and determine at least one marketing incentive that the player account might prefer, based on the personal information and/or marketing metadata. The system can also determine an incentive provider that provides the marketing incentive. The system can communicate with incentive providers and present the potential incentives that the system is planning to present to the player account. The system can receive response information from the incentive providers to modify the potential incentives to make them more appealing or valuable (e.g., a marketing partner sees that the system is going to provide a 10% discount for the marketing partner's goods, but a rival competitor is providing 15%, so the marketing partner changes the 10% discount to 20%). The system can also generate a redemption certificate specific to the at least one incentive provider (e.g., a printable coupon with a bar code, an e-tailer coupon code, a gift certificate).

The flow 400 continues at processing block 410, where the system provides the one or more marketing incentives to the player account. The system can send the marketing incentives (e.g., redemption certificate) to the player account electronically (e.g., via email, via a player account interface, on a casino website, etc.), via mail, or in some other way.

Figure 5:
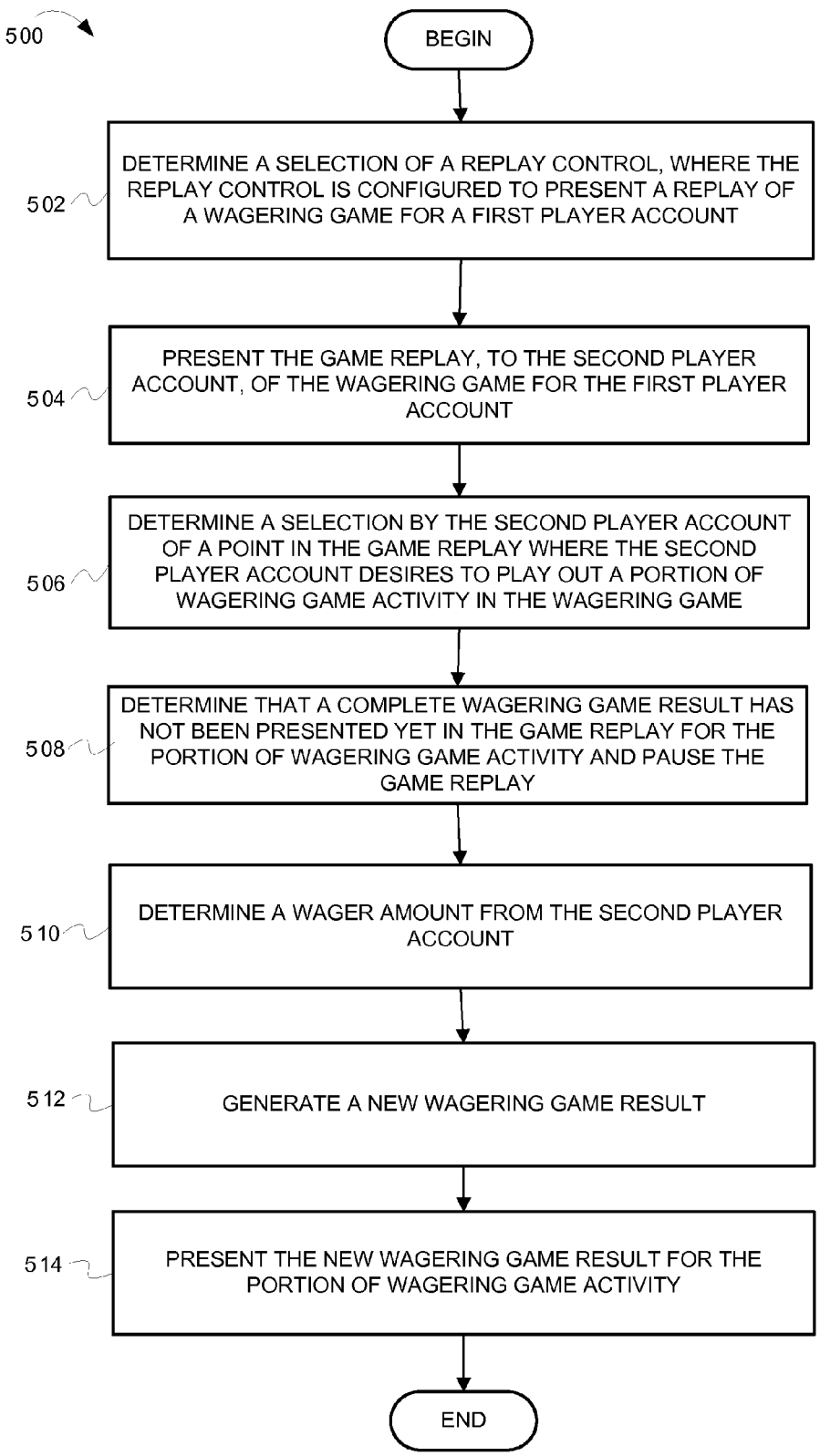
FIG. 5 is a flow diagram 500 illustrating presenting wagering game replays and break-out gaming sessions, according to some embodiments.
Figure 6:
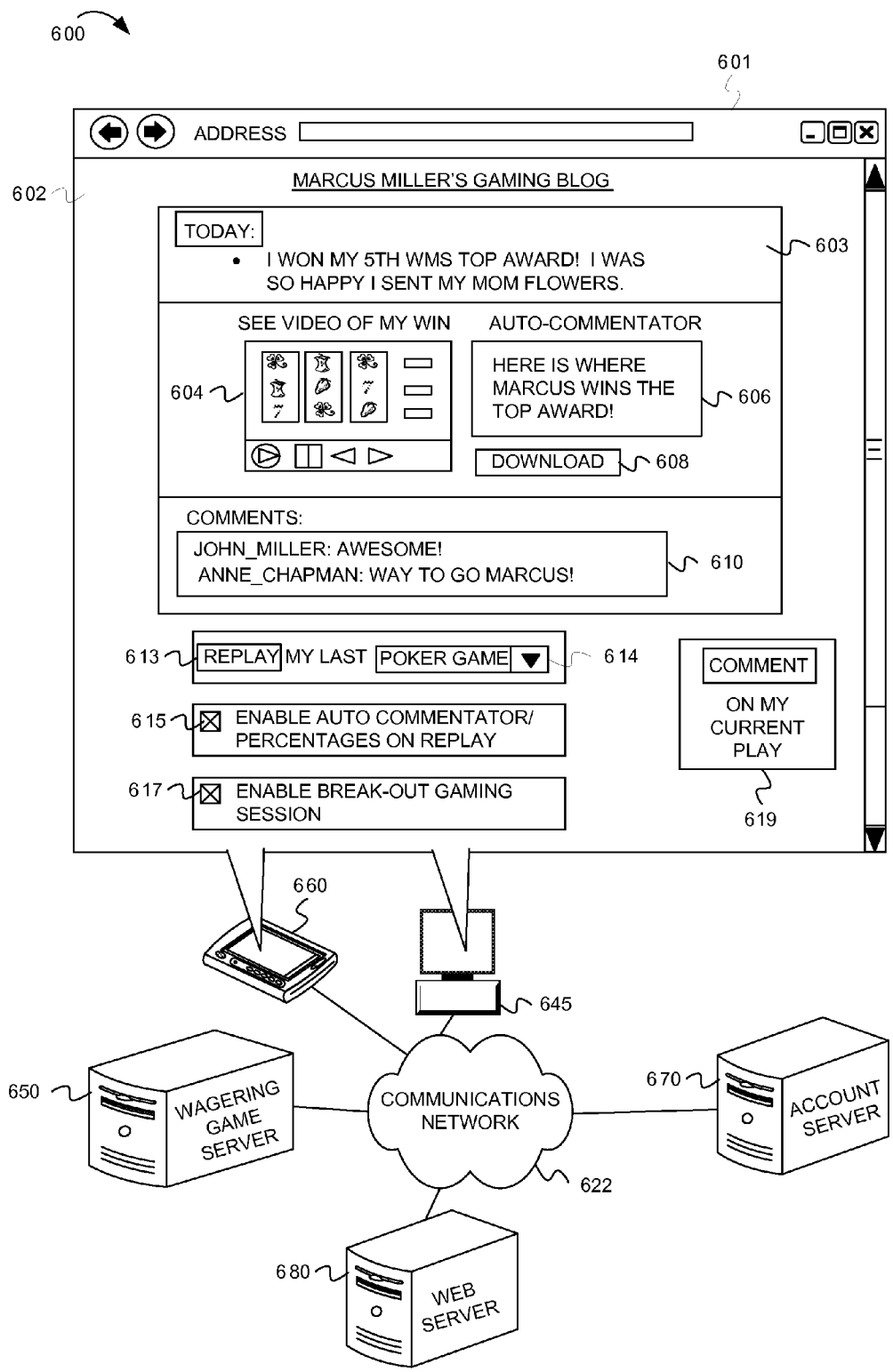
FIG. 6 is an illustration of presenting an example wagering game web log, according to some embodiments.

FIG. 5 is a flow diagram ("flow") 500 illustrating presenting wagering game replays and break-out gaming sessions, according to some embodiments. FIG. 6 is a conceptual diagram that helps illustrate the flow of FIG. 5, according to some embodiments. This description will present FIG. 5 in concert with FIG. 6. In FIG. 5, the flow 500 begins at processing block 502, where a wagering game system ("system") determines a selection of a replay control, wherein the replay control is configured to present a replay of a wagering game for a first player account. In some embodiments, the system can present the replay control on a web page, like a web log ("blog"). FIG. 6 illustrates an example wagering game blog ("gaming blog") 602. The gaming blog 602 is presented in a web browser 601 presented on a computer system ("computer") 645. The computer 645 can be connected to a communications network 622. Also connected to the communications network 622 are a wagering game machine 660, an wagering game server 650, an account server 670, and a web server 680. The wagering game machine 660 can also display the gaming blog 602, as would other client devices not shown (e.g., a cell phone, a video game machine, etc.). The web server 680 can host the gaming blog 602. The gaming blog 602 can have various controls and features according to embodiments. For example, the gaming blog 602 can have a control to post blog entries ("posts") from the blog web page about gaming activity. The blog can also remotely post player entries (e.g., microblogging, posts via a cell phone, etc.) and display them in a posts section 603. In some embodiments, the system 600 can present a video control 604 to present recorded video showing a gaming achievement or other activity (e.g., relevant activity to the topic of the post in the posts section 603). In some embodiments, the system 600 can present a comments section 610 so that blog visitors can comment on posts, videos, replays, current play, etc. Blog visitors can vote on wagering game activity (e.g., what the player account would do next, what the next play could be, what the player account should have done, etc.). The system 600 can provide controls for visitors to give game advice (e.g., dial a friend), ratings, etc. In some embodiments, the system 600 can present wagering controls to wager on the player account's game activity. In some embodiments, the system can present an automated commentator 606 that automatically comments or discusses (e.g., blow by blow) what occurs during wagering activity (e.g., replays, current play, etc.) presented on the gaming blog 602. The automated commentator 606 is an editorial tool that writes a blog comment, post, or other entry, based on metadata of game activity. The automated commentator 606 can also create entries when there was no gaming activity (e.g., didn't play today). The automated commentator 606 can add embellishments to commentary (e.g., humor, background sounds, trivia, animations, etc.). The automated commentator 606 can also provide reminders, casino venue information, etc. The automated commentator 606 can show information (e.g., poker hand percentages) for entertainment purposes that normally wouldn't be shown during a wagering game. In some embodiments, the automated commentator 606 can track who is the player is playing against and provide information about opponents (e.g., chip counts for all players, opponent playing history, opponent tells, etc.). In some embodiments, the system 600 can broadcast video images of gaming activity to the blog in real-time and send links to friends of what the player account displayed on the blog. In some embodiments, the system 600 can present a current play monitor 619 to display the player account's current play. Referring back to the processing block 502, the system 600 can also present a replay control 613 to replay a specific wagering game or activity. The replay control 613 can include a game selection control 614 to select a specific game played by the player account. The system 600 can also present features associated with the replay control 613, such as an auto-commentator checkbox 615 to enable auto-commentary on the game replay, or a break-out gaming session checkbox 617 to enable the blog visitor to play portions of the game replay with different game results for the portions of the game replay that the blog visitor plays. The blog visitor may have a player account as well (e.g., a second player account, on the account server 670, different from the first player account that originally played the game being replayed), and the second account may also wager on their own play during the game replay break-out session.

The flow 500 continues at processing block 504, where the system presents the game replay, to the second player account. In some embodiments, the system can stream gameplay metadata. For instance, the system 600 can present a download control 608 which downloads a script, or metadata, that will reconstruct the game replay using wagering game assets (e.g., game assets stored on the computer 645). The game replay, therefore could be a reproduction using game assets (e.g., via a game animation versus a video reproduction) by loading the script and/or metadata, and allowing the game replay tool to reconstruct the gaming activity. The system can update the information immediately, or periodically, via a streaming script.

The flow 500 continues at processing block 506, where the system determines a selection by the second player account of a point in the game replay where the second player account desires to play out a portion of wagering game activity in the wagering game. A player account may want to break out of the game replay and begin playing in place of the first player account. This would allow the second player account to potentially play the wagering game differently than the first player account The flow 500 continues at processing block 508, where the system determines that a complete wagering game result has not been presented yet in the game replay for the portion of wagering game activity and pause the game replay. For example, in a poker game, there may be several points where the second player account can select a break-away point to play out a portion of the wagering game in a break-away session, but where a final game result hasn't been displayed yet (e.g., the cards have not been dealt yet in a game of poker, the cards have been dealt but betting hasn't begun, betting has begun but the opponent hasn't shown his hand, etc.). Other types of games can also be paused before showing a wagering game result. For example, a slot game can be paused before a spin is begun, during a spin but before the slot reel icons are stopped in final resting positions, after some slot reel icons are stopped but not all slot reel icons are stopped, etc. If the system determines that it is too late to pause the game, the system can present the final wagering game result and pause the game at the next possible break-away point (e.g., before the next game result has been presented).

The flow 500 continues at processing block 510, where the system determines a wager amount from the second player account. In some embodiments, the system can prompt the second player account for a wager amount. The system can default the wager amount to be the same as the first player account for the same portion of the wagering game activity, but the system can present controls for the second player account to change the wager to a higher or lower value. The system can transact the wager amount from the second player account. In some embodiments, the system can modify (e.g., increase or decrease) the potential wager amount based on how much information is presented from the game replay. For example, the system may permit a break-out session in a slot game replay up to the point where the last slot reel stops spinning. However, if some reels on a slot game replay have stopped, showing a partial outcome, but other reels are still spinning, the system may enforce bet multipliers requiring the second player account to bet high risk amounts commensurate with the amount of the outcome already presented (e.g., one stopped reel forces a 10× multiplier, two stopped reels forces a 20× multiplier, etc.).

The flow 500 continues at processing block 512, where the system generates a new wagering game result. In some embodiments, the system can generate a new, random wagering game result that is potentially different than the wagering game result from the game replay (e.g., the wagering game server 650 can provide a new wagering game result). The system can use the new wagering game result for the break-away game session. The new wagering game result can be modified to fit the break-out point. For instance, if the second player account broke out of the game replay after four out of five reels stopped spinning, but the final reel was still spinning, the system may generate a random value for the final resting position of the final reel so that it may present a different reel icon than what was presented in the game replay.

The flow 500 continues at processing block 514, where the system presents the new wagering game result, to the second player account, for the portion of wagering game activity. In some embodiments, the system can still use similar elements from the game replay (e.g., similar theme elements, similar chip counts, similar opponents, etc.). In some embodiments, the system can transact a winning value to the second player account if the new wagering game result results in a win.

Figure 7:
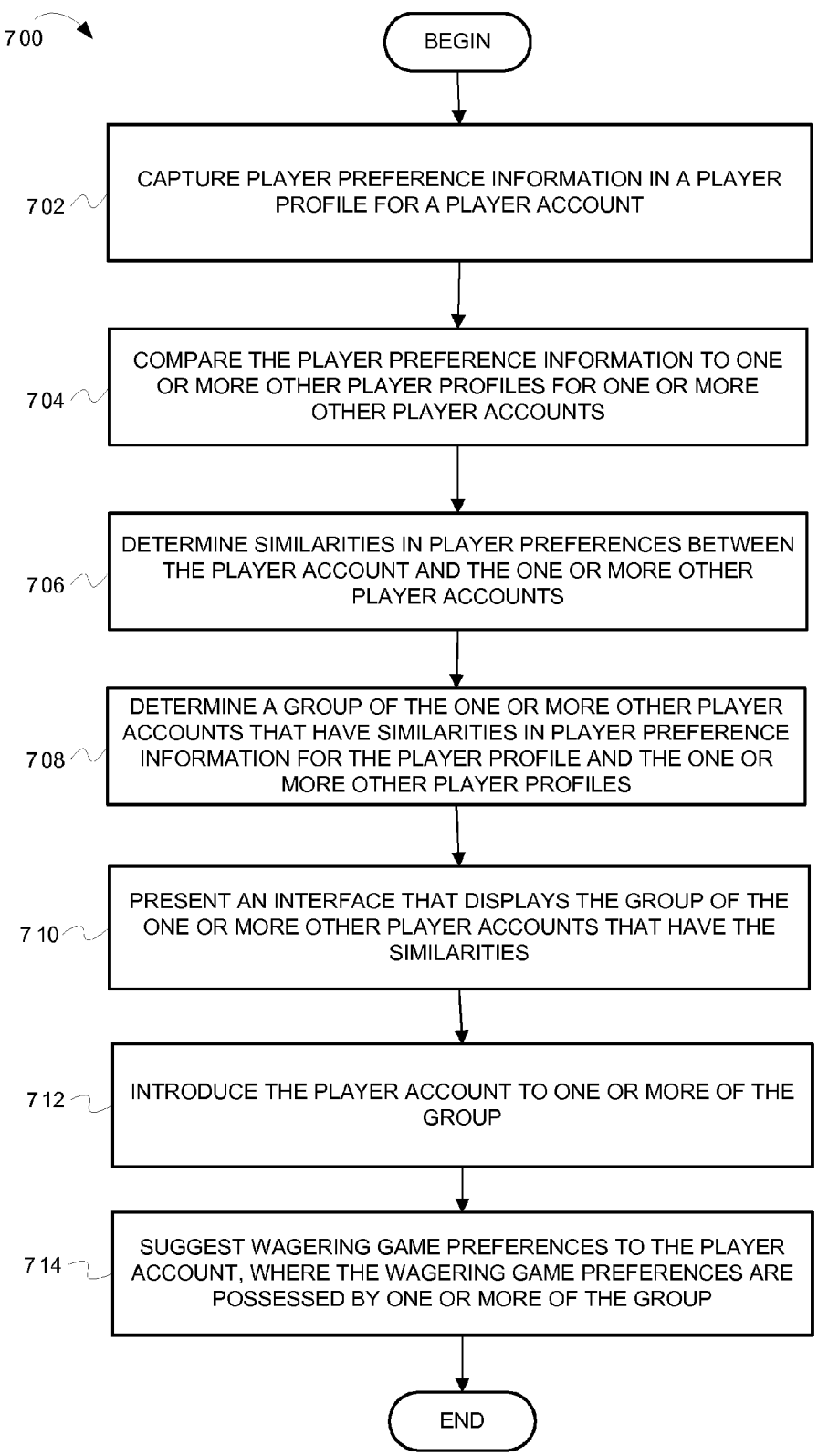
FIG. 7 is a flow diagram 700 illustrating comparing similarities between wagering game player accounts and matching player accounts for social interaction and suggestions, according to some embodiments.
Figure 8:
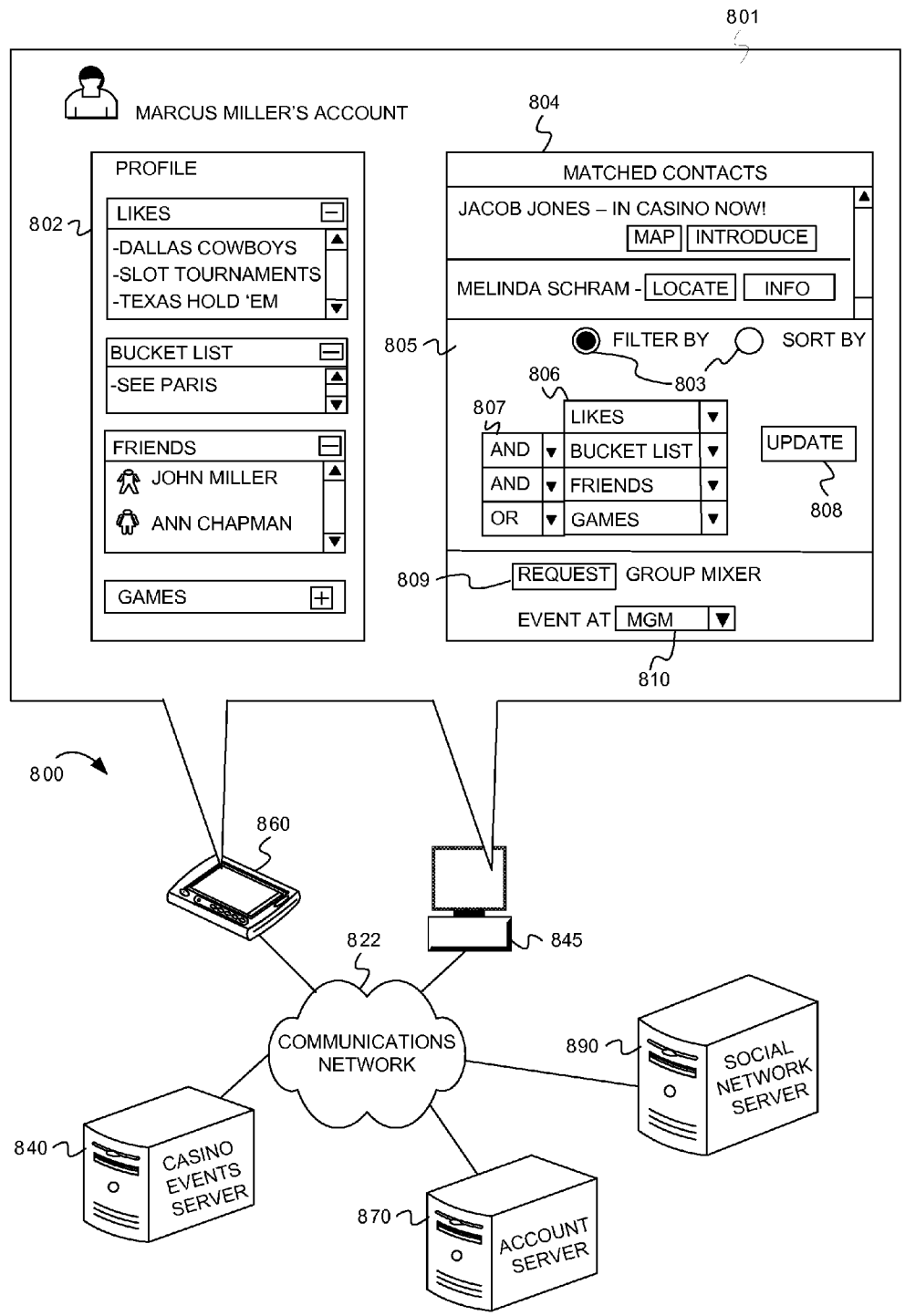
FIG. 8 is an illustration of presenting matched wagering game player accounts in a user interface for filtering results and participating in social interactions, according to some embodiments.

FIG. 7 is a flow diagram ("flow") 700 illustrating comparing similarities between wagering game player accounts and matching player accounts for social interaction and suggestions, according to some embodiments. FIG. 8 is a conceptual diagram that helps illustrate the flow of FIG. 7, according to some embodiments. This description will present FIG. 7 in concert with FIG. 8. In FIG. 7, the flow 700 begins at processing block 702, where a wagering game system ("system") captures player preference information in a player profile for a player account. For example, in FIG. 8, a wagering game system ("system") 800 includes a computer system ("computer") 845 that displays a player account interface 801 that presents a player profile 802 for a player account. The computer 845 is connected to communications network 822. Also connected to the communications network 822 are a social network server 890, an account server 870, a casino events server 840 and a wagering game machine 860. The account server 870 can store information for the player account. The social network server 890 can store information related to a social network. The player account can be a part of, or in some way connected with, the social network (e.g., the player account can also be an account on the social network). The social network server 890 and/or the account server 870 can also store information for many other accounts (e.g., other player accounts, other social network accounts, etc.). The wagering game machine 860 can also present the player account interface 801. The player profile 802 includes preferences related to various topics, such as sports, politics, career, travel, friends, game types, a bucket list, etc.

The flow 700 continues at processing block 704, where the system compares the player preference information to one or more other player profiles for one or more other player accounts. For instance, in FIG. 8, the system 800 can search the account server 870, the social network server 890, a social contact database (e.g., a contact database on the client machine), one or more social networks found on the Internet (e.g., FaceBook™, MySpace™, LinkedIn™, etc.), or any other data source, for the one or more other player profiles. The player profiles can be related to player accounts for social contacts (e.g., friends), player's in a geographic location, player's in a casino, player's scheduled to be in a casino on the same date range, etc.

The flow 700 continues at processing block 706, where the system determines similarities in player preferences between the player account and the one or more other player accounts. For example, in FIG. 8, the system 800 can determine similarities that relate to the topics stored in a player profile 802.

The flow 700 continues at processing block 708, where the system determines a group of the one or more other player accounts that have similarities in player preference information for the player profile and the one or more other player profiles. For example, in FIG. 8, the system 800 searches through accounts on the social network server 890, the account server 870, the computer 845, etc., and looks at items that the player account has listed in the player profile 802 that match items, or similar items, that other player accounts have listed in their own profiles, preference settings, etc. When the system 800 finds a match (or similarity), it can tag the matching account or store it in a data set to present subsequently.

The flow 700 continues at processing block 710, where the system presents an interface that displays the group of the other player accounts that have the similarities. In some embodiments, the system can present the related information on a public website or on a private website associated with the player account. In FIG. 8, the system 800 presents the group of matched accounts in a matched contacts display 804. The matched contacts display 804 can group the matched accounts according categories of similarities, rankings, etc. In some embodiments, the system 800 can present one or more search controls 805 to filter and/or sort the group based on categories. The search controls 805 can include filter and sort buttons 803, search or filter fields 806, search operators 807 (e.g., Boolean operators), and a search update button 808.

The flow 700 continues at processing block 712, where the system introduces the player account to one or more of the group. For instance, in FIG. 8, within the matched contacts display 804 the system 800 can present controls to be introduced to the matched account, to locate the matched account (e.g., online, offline, in a geographic location, at home, at work, etc.), and to obtain information about the matched account. The system 800 can display which matched accounts are logged on to an online casino, which ones are in a physical casino, etc. If the matched account is in a casino, the matched contact display 804 can provide a map to their location within the casino (e.g., using player location equipment). If the matched account provides direction to a geographic location of where the matched contact can be found, the system 800 can provide geographic maps to the matched accounts location. In some embodiments, the system 800 can present an event schedule control 809 to schedule an event for a get together at a location indicated in a location list 810. In some embodiments, the system 800 can automatically schedule the event, without being manually requested, and provide information about where and when the event is to be held so that matched accounts can meet in person. The system 800 can schedule an event that is thematically related to one or more of the similarities. For example, the system 800 can present a bucket list of things the player associated with the player account wants to do in life. The system 800 matches the player account up with others who also want to do that same things and then schedules an activity (e.g., an online chat session, a casino trip, etc.) related to one of the items on the list. The system 800 can check scheduling software (e.g., Outlook) on the computer 845 to find available dates. The system 800 can send an inquiry to the casino events server 840, which contains scheduling information for locations and dates to hold the event. The system 800 can send invitations for an event at an available date and location to the player account and the matched accounts via the player account interface 801, via email, via regular mail, via text messaging, via chat, via the scheduling software, or in other ways. The system 800 can determine who has accepted invitations to the event and schedule rooms, activities, catering, etc. The system 800 can make reservations for banks of slot games, reservations for hotel stay, reservation for chat rooms, etc. The system 800 can schedule online game events (e.g., a meeting in a virtual world). The system 800 can schedule similar events at same times in different geographic locations (e.g., different casinos) and network the locations.

The flow 700 continues at processing block 714, where the system suggests wagering game preferences to the player account. The system can suggest wagering game preferences that are possessed by one or more of the matched account group. In some embodiments, the system can suggest a wagering game based on the similarities shared by social contact accounts associated with the player account (e.g., the system suggests a friend's likes and aggregates information from the friend, then makes a suggestion). In some embodiments, the system can suggest merchandise items that a matched account may like and present controls to purchase the merchandise items. The system can send the items to the matched accounts.

Additional Example Embodiments

According to some embodiments, a wagering game system ("system") can provide various example devices, operations, etc., to control and present in-casino to online casino interactivity. The following non-exhaustive list enumerates some possible embodiments.
   In some embodiments, the system can present tournament boards and score boards on an online wagering game website based on activity that occurred in the casino
   In some embodiments, the system can present controls so that players can design your own game challenges and present them on the wagering game website
   In some embodiments, the system can present in-casino activity that unlocks online content. A player would have to go to a website to see the unlocked online content. The system can also present online activity that unlocks casino content, where the player would need to visit a casino to see the unlocked casino content.
   In some embodiments, the system can present hidden goals that a player didn't know about. The system can also provide a surprise high-roller status to a player for online activity.
   In some embodiments, the system can show ladders, groups, team achievements, etc. The system can also show statistics of what friends have done.
   In some embodiments, the system can schedule private room gaming from the wagering game website. The system can present a list of themes for the player account to select and can prepare the room based on a selected theme.

Additional Example Operating Environments

This section describes example operating environments, systems and networks, and presents structural aspects of some embodiments.

Wagering Game Machine Architecture

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UtraSPARC processor. The main memory 928 includes a wagering game unit 932. In some embodiments, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a wagering game module 937. The wagering game module 937 can process communications, commands, or other information, where the processing can control and present in-casino to online casino interactivity.

Furthermore, any component of the wagering game machine 906 can include hardware, firmware, and/or machine-readable media including instructions for performing the operations described herein.

Mobile Wagering Game Machine

Figure 10:
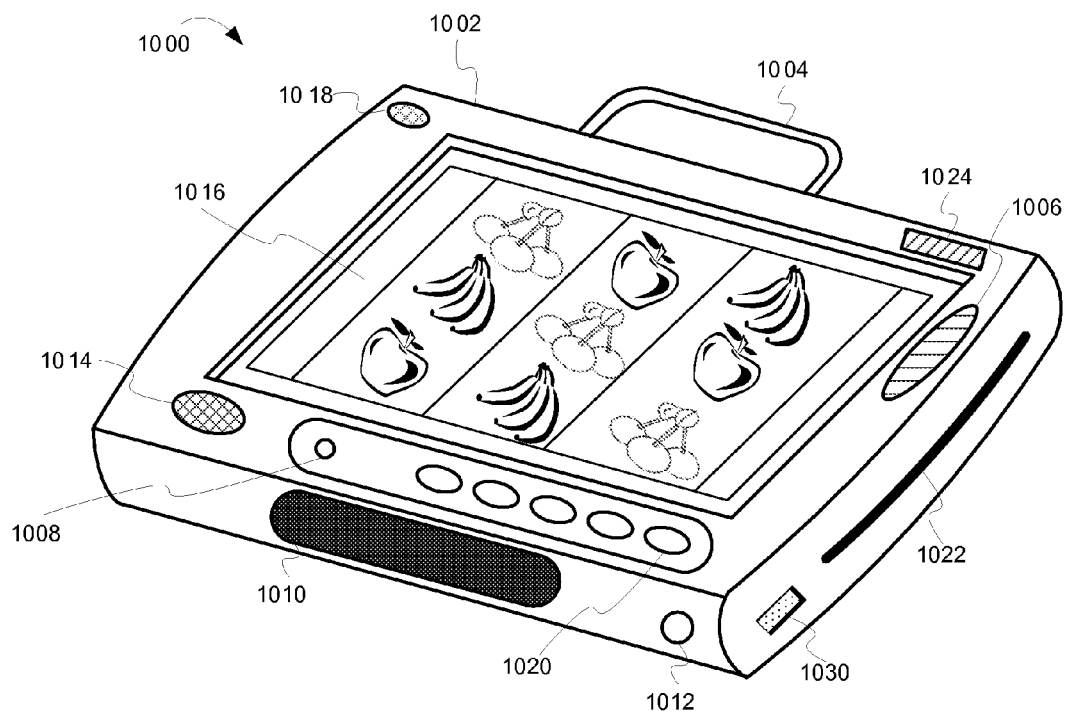
FIG. 10 is an illustration of a mobile wagering game machine 1000, according to some embodiments.

FIG. 10 is a conceptual diagram that illustrates an example of a mobile wagering game machine 1000, according to some embodiments. In FIG. 10, the mobile wagering game machine 1000 includes a housing 1002 for containing internal hardware and/or software such as that described above vis-à-vis FIG. 9. In some embodiments, the housing has a form factor similar to a tablet PC, while other embodiments have different form factors. For example, the mobile wagering game machine 1000 can exhibit smaller form factors, similar to those associated with personal digital assistants. In some embodiments, a handle 1004 is attached to the housing 1002. Additionally, the housing can store a foldout stand 1010, which can hold the mobile wagering game machine 1000 upright or semi-upright on a table or other flat surface.

The mobile wagering game machine 1000 includes several input/output devices. In particular, the mobile wagering game machine 1000 includes buttons 1020, audio jack 1008, speaker 1014, display 1016, biometric device 1006, wireless transmission devices (e.g., wireless communication units 1012 and 1024), microphone 1018, and card reader 1022. Additionally, the mobile wagering game machine can include tilt, orientation, ambient light, or other environmental sensors.

In some embodiments, the mobile wagering game machine 1000 uses the biometric device 1006 for authenticating players, whereas it uses the display 1016 and the speaker 1014 for presenting wagering game results and other information (e.g., credits, progressive jackpots, etc.). The mobile wagering game machine 1000 can also present audio through the audio jack 1008 or through a wireless link such as Bluetooth.

In some embodiments, the wireless communication unit 1012 can include infrared wireless communications technology for receiving wagering game content while docked in a wager gaming station. The wireless communication unit 1024 can include an 802.11G transceiver for connecting to and exchanging information with wireless access points. The wireless communication unit 1024 can include a Bluetooth transceiver for exchanging information with other Bluetooth enabled devices.

In some embodiments, the mobile wagering game machine 1000 is constructed from damage resistant materials, such as polymer plastics. Portions of the mobile wagering game machine 1000 can be constructed from non-porous plastics which exhibit antimicrobial qualities. Also, the mobile wagering game machine 1000 can be liquid resistant for easy cleaning and sanitization.

In some embodiments, the mobile wagering game machine 1000 can also include an input/output ("I/O") port 1030 for connecting directly to another device, such as to a peripheral device, a secondary mobile machine, etc. Furthermore, any component of the mobile wagering game machine 1000 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method, comprising:
    determining an activity performed via player input at a wagering game machine during a wagering game session, wherein the wagering game session is associated with a player account;
    generating descriptive data that describes the activity;
    determining, using the descriptive data, a first marketing incentive related to the descriptive data;
    providing an indication of the first marketing incentive to an incentive provider;
    receiving a second marketing incentive from the incentive provider in reply to the providing the indication of the first marketing incentive to the incentive provider;
    determining that the second marketing incentive is more valuable than the first marketing incentive; and
    providing the second marketing incentive using player contact information stored in the player account.

2. The computer-implemented method of claim 1, wherein the determining that the second marketing incentive is more valuable than the first marketing incentive includes
    analyzing player preferences from the player account, and
    determining that the second marketing incentive is more valuable based on the player preferences.

3. The computer-implemented method of claim 1, wherein the determining, using the descriptive data, the first marketing incentive related to the descriptive data comprises:
    accessing a list of marketing incentives;
    comparing the descriptive data to descriptions of the marketing incentives; and selecting the first marketing incentive from the list of marketing incentives based on the comparing the descriptive data to the descriptions of the marketing incentives.

4. The method of claim 1, further comprising:
using the marketing data to drive traffic to a website for the incentive provider.

5. The computer-implemented method of claim 1, wherein the activity is non-wagering activity.

6. One or more non-transitory, machine-readable storage media having instructions stored thereon, which when executed by a set of one or more processors causes the set of one or more processors to perform operations comprising:
determining an activity performed via player input at a wagering game machine, wherein the player input is associated with a player account;
generating descriptive data that describes the activity;
determining, using the descriptive data, a first marketing incentive related to the descriptive data;
providing an indication of the first marketing incentive to an incentive provider;
receiving a second marketing incentive from the incentive provider based on the indication of the first marketing incentive;
determining that the second marketing incentive is more valuable than the first marketing incentive; and
providing the second marketing incentive using player contact information stored in the player account.

7. The one or more non-transitory, machine readable storage media of claim 6, wherein the operation of determining that the second marketing incentive is more valuable than the first marketing incentive includes operations comprising:
analyzing player preferences from the player account; and
determining that the second marketing incentive is more valuable based on the player preferences.

8. The one or more non-transitory, machine readable storage media of claim 6, wherein the operation of determining, using the descriptive data, the first marketing incentive related to the descriptive data includes operations comprising:
accessing a list of marketing incentives;
comparing the descriptive data to descriptions of the marketing incentives; and
selecting the first marketing incentive from the list of marketing incentives based on the comparing the descriptive data to the descriptions of the marketing incentives.

9. The one or more non-transitory, machine readable storage media of claim 6, said operations further comprising:
using the marketing data to drive traffic to a website for the incentive provider.

10. The one or more non-transitory, machine readable storage media of claim 6, wherein the activity is non-wagering activity.

11. A system comprising:
one or more processors; and
one or more memory units configured to store instructions, which when executed by at least one of the one or more processors, cause the system to perform operations to
determine an activity performed via player input at a wagering game machine, wherein the player input is associated with a player account,
generate descriptive data that describes the activity,
determine, using the descriptive data, a first marketing incentive related to the descriptive data,
provide an indication of the first marketing incentive to an incentive provider,
receive a second marketing incentive from the incentive provider in reply to the indication of the first marketing incentive,
determine that the second marketing incentive is more valuable than the first marketing incentive, and
provide the second marketing incentive using player contact information stored in the player account.

12. The system of claim 11, wherein the one or more memory units configured to store the instruction to cause the system to perform the operation to determine that the second marketing incentive is more valuable than the first marketing incentive, is configured to store instructions, which when executed by the at least one of the one or more processors, cause the system to perform operations to:
analyze player preferences from the player account; and
determine that the second marketing incentive is more valuable based on the player preferences.

13. The system of claim 11, wherein the one or more memory units configured to store the instruction to cause the system to perform the operation to determine, using the descriptive data, the first marketing incentive related to the descriptive data, is configured to store instructions, which when executed by the at least one of the one or more processors, cause the system to perform operations to:
access a list of marketing incentives;
compare the descriptive data to descriptions of the marketing incentives; and
select the first marketing incentive from the list of marketing incentives based on comparison of the descriptive data to the descriptions of the marketing incentives.

14. The system of claim 11, wherein the one or more memory units are configured to store instructions, which when executed by the at least one of the one or more processors, cause the system to further perform operations to
use the marketing data to drive traffic to a website for the incentive provider.

15. The system of claim 11, wherein the activity is non-wagering activity.

16. An apparatus comprising:
means for determining an activity performed via player input, wherein the player input is associated with a player account;
means for generating descriptive data that describes the activity;
means for determining, using the descriptive data, a first marketing incentive related to the descriptive data;
means for providing an indication of the first marketing incentive to an incentive provider;
means for receiving a second marketing incentive from the incentive provider after the indication of the first marketing incentive is provided to the incentive provider;
means for determining that the second marketing incentive is more valuable than the first marketing incentive; and
means for providing the second marketing incentive using player contact information stored in the player account.

17. The apparatus of 16, wherein the means for determining that the second marketing incentive is more valuable than the first marketing incentive comprises:
means for analyzing player preferences from the player account; and
means for determining that the second marketing incentive is more valuable based on the player preferences.

18. The apparatus claim 16, wherein the means for determining, using the descriptive data, the first marketing incentive related to the descriptive data comprises:
means for accessing a list of marketing incentives;

means for comparing the descriptive data to descriptions of the marketing incentives; and means for selecting the first marketing incentive from the list of marketing incentives based on the comparing the descriptive data to the descriptions of the marketing incentives.

19. The apparatus of claim 16 further comprising:

means for using the marketing data to drive traffic to a website for the incentive provider.

20. The apparatus of claim 16, wherein the activity is non-wagering activity.

* * * * *